United States Patent [19]

Coran et al.

[11] 4,197,379

[45] Apr. 8, 1980

[54] ELASTOPLASTIC COMPOSITIONS OF RUBBER AND POLYAMIDE

[75] Inventors: Aubert Y. Coran; Raman P. Patel, both of Akron, Ohio

[73] Assignee: Monsanto Company, St. Louis, Mo.

[21] Appl. No.: 863,306

[22] Filed: Dec. 22, 1977

Related U.S. Application Data

[63] Continuation-in-part of Ser. No. 816,096, Jul. 15, 1977, which is a continuation-in-part of Ser. No. 663,453, Mar. 3, 1976, abandoned.

[51] Int. Cl.$^2$ .......................... C08L 9/02; C08L 77/00
[52] U.S. Cl. ..................................... 525/142; 525/184
[58] Field of Search ............... 260/845, 857 D, 857 F

[56] References Cited

U.S. PATENT DOCUMENTS

| | | | |
|---|---|---|---|
| 2,649,431 | 8/1953 | Little | 260/845 |
| 2,698,313 | 12/1954 | Daly | 260/893 |
| 3,194,294 | 7/1965 | van Gils | 260/845 |
| 3,277,209 | 10/1966 | Giller | 260/845 |
| 3,324,197 | 6/1967 | Schwarzer | 260/845 |

*Primary Examiner*—J. Ziegler
*Attorney, Agent, or Firm*—Larry R. Swaney

[57] ABSTRACT

Elastoplastic compositions are described comprising blends of cross-linked rubber and thermoplastic polyamide.

7 Claims, No Drawings

ELASTOPLASTIC COMPOSITIONS OF RUBBER AND POLYAMIDE

This application is a continuation-in-part application of U.S. patent application Ser. No. 816,096 filed July 15, 1977 which is a continuation-in-part application of U.S. patent application Ser. No. 663,453 filed Mar. 3, 1976 now abandoned.

This invention relates to thermoplastic compositions and, more particularly, to thermoplastic elastomeric compositions comprising blends of polyamide and cross-linked rubber.

BACKGROUND OF THE INVENTION

Thermoplastics are compositions which can be molded or otherwise shaped and reprocessed at temperatures above their melting or softening point. Thermoplastic elastomers (elastoplastics) are materials which exhibit both thermoplastic and elastomeric properties, i.e., the materials process as thermoplastics but have physical properties like elastomers. Shaped articles may be formed from thermoplastic elastomers by extrusion, injection molding or compression molding without the time-consuming cure step required with conventional vulcanizates. Elimination of the time required to effect vulcanization provides significant manufacturing advantages. Further, thermoplastic elastomers can be reprocessed without the need for reclaiming, and, in addition, many thermoplastics can be thermally welded.

Moldable thermoplastic compositions of nylon and cured rubber containing high proportions of nylon prepared from scrap tire cord material are known but such compositions are rigid nonelastomeric materials of high stiffness and low elongation (Elgin, U.S. Pat. No. 3,468,794). Moldable thermoplastic compositions of nylon and curable rubber containing high proportions of rubber are known which compositions are cured in a mold (British Pat. Nos. 866,479 and 1,190,049). These compositions, of course, are not thermoplastic after cure and not remoldable as thermoplastic. Elastoplastic compositions of nylon and rubber containing phenol plasticizers are described in French Pat. No. 1,592,857. Resorcinol and hydroquinone both dihydric phenols are illustrated as plasticizers. The patent indicates that the presence of phenolic plasticizer is essential for obtaining thermoplasticity.

SUMMARY OF THE INVENTION

This invention concerns moldable thermoplastic elastomeric compositions comprising blends, essentially free of low molecular weight phenol plasticizer, of crystalline polyamide and cross-linked rubber. Surprisingly, it has been found that improved elastoplastic compositions of crystalline polyamide and cross-linked rubber can be prepared in the absence of low molecular weight phenol plasticizer. The presence of low molecular weight phenol plasticizer is not only unnecessary to obtain thermoplastic elastomeric compositions but it adversely affects the properties. Compositions of the invention exhibit high load-bearing capacity (high modulus) compared to similar compositions containing even small amounts of low molecular weight phenol plasticizer and exhibit high tensile strengths compared to similar compositions containing large quantities of said phenol plasticizer. Low molecular weight phenol plasticizers reduce the crystallinity and melting point of the polyamide which reduces the modulus of the resulting blend and also reduces the temperature range over which the blend is thermoplastic. In addition, said phenol plasticizers especially at high concentrations, suppress the cross-linking of the rubber thereby substantially reducing the tensile strength of the resulting blend. Thus, elastoplastic compositions in accordance with this invention are compositions comprising blends essentially free of low molecular weight phenol plasticizer of (a) thermoplastic crystalline polyamide in an amount sufficient to impart thermoplasticity up to 50 weight percent of the composition and (b) rubber cross-linked to the extent that the gel content of the rubber is at least about 80 percent, the rubber being a homopolymer or copolymer of 1,3-butadiene or isoprene, in an amount sufficient to impart rubberlike elasticity up to 80 weight percent of the composition which compositions are processable as thermoplastics and are elastomeric. The compositions can contain inert plasticizer for polyamide or rubber provided that the plasticizer is inert so that it does not severely affect the crystallinity of the polyamide. However, if the composition contains more polyamide than rubber, sufficient inert plastic must be present to impart rubberlike elasticity to the composition which minimum quantities of inert plasticizer is such that the total weight of rubber and inert plasticizer is equal to or greater than the weight of polyamide in the composition. Compositions frequently contain inert plasticizer in an amount not exceeding the weight of the polyamide. The invention in part is the discovery that thermoplastic elastomeric compositions can be obtained without any plasticizer whatsoever so long as the amount of crystalline polyamide does not exceed 50 weight percent of the composition. In compositions containing 50 weight percent or less of polyamide, inert plasticizers optionally may be present but they are not required to obtain elastoplasticity unless the amount of polyamide exceeds the amount of rubber. Preferred compositions of the invention comprise blends in which the amount of rubber exceeds the amount of crystalline polyamide, particularly blends of (a) about 20–50 parts by weight of thermoplastic crystalline polyamide and (b) about 80–50 parts by weight of rubber per 100 parts total weight of polyamide and rubber. More preferred compositions comprise blends of about 20–45 percent by weight of crystalline polyamide and about 80–55 percent by weight of the rubber. The compositions are elastomeric and are processable as thermoplastics even though the rubber is cross-linked to a point where it is 80 percent insoluble in the usual organic solvents for the unvulcanized rubber and they retain thermoplasticity even when the rubber is cross-linked to the extent that the rubber is essentially completely insoluble. The indicated relative proportions of polyamide and rubber are necessary to provide sufficient rubber to give elastomeric compositions and to provide sufficient crystalline polyamide to give thermoplasticity. When the amount of rubber exceeds about 80 parts by weight per 100 parts total weight of polyamide and rubber, there is insufficient crystalline polyamide present to provide thermoplasticity. In the absence of plasticizer, when the quantity of rubber falls below about 50 parts by weight per 100 parts total weight of crystalline polyamide and rubber or when the quantity of crystalline polyamide exceeds 50 weight percent of the composition, hard, rigid compositions having reduced toughness are obtained. The blends of the invention are envisaged as comprising microscopic-sized particles of cross-linked rubber dispersed throughout a continuous polyamide matrix. Especially preferred compositions of the invention comprising cross-linked nitrile rubber are characterized by toughness, as represented by $TS^2/E$ wherein TS is tensile strength and E is Young's modulus, of at least 50% more than that of a composition containing equal portions of polyamide and rubber.

As indicated, the thermoplastic elastomers of the invention are rubbery compositions in which the rubber portion of the blend is cross-linked to a gel content of 80% or more or a cross-link density of $3 \times 10^{-5}$ or more moles per milliliter of rubber. The procedure appropriate for evaluating cross-link density depends upon the particular ingredients present in the blends. The properties of the compositions can be improved by further cross-linking the rubber until it is essentially completely cured which state of cure is usually indicated by a gel content of 96% or more. However, in this connection, essentially complete gelation of say 96% or more is not always a necessary criterion of a fully cured product because of differences in molecular weight, molecular weight distribution and other variables among diene rubbers which influence the gel determination. Determination of the cross-link density of the rubber is an alternative means of determining state of cure of the vulcanizates but must be determined indirectly because the presence of the polyamide interferes with the determination. Accordingly, the same rubber as present in the blend is treated under conditions with respect to time, temperature, and amount of curative which result in a fully cured product as demonstrated by its cross-link density, and such cross-link density is assigned to the blend similarly treated. In general, a cross-link density of about $7 \times 10^{-5}$ or more moles (number of cross-links divided by Avogadro's number) per milliliter of rubber is representative of the values for fully cured nitrile rubber, however, this value may be as low as about $5 \times 10^{-5}$ especially for polybutadiene rubber or polybutadiene-styrene rubber. An effect of curing the composition is the very substantial improvement in tensile properties which improvement directly relates to its practical uses. Surprisingly, such high strength elastomeric compositions are still thermoplastic as contrasted to thermoset elastomers.

Vulcanizable rubbers, although thermoplastic in the unvulcanized state, are normally classified as thermosets because they undergo the process of thermosetting to an unprocessable state. The products of the instant invention, although processable, are prepared from blends of rubber and polyamide which are treated under time and temperature conditions to cross-link the rubber or are treated with curatives in amounts and under time and temperature conditions known to give cured products from static cures of the rubber in molds and, indeed, the rubber has undergone gelation to the extent characteristic of rubber subjected to a similar treatment alone. Thermosets are avoided in the compositions of the invention by simultaneously masticating and curing the blends. Thus, the thermoplastic compositions of the invention are preferably prepared by blending a mixture of rubber, polyamide, and curatives when required, then masticating the blend at a temperature sufficient to effect cross-link formation, using conventional masticating equipment, for example, Banbury mixer, Brabender mixer, or certain mixing extruders. The polyamide and rubber are mixed at a temperature sufficient to soften the polyamide or, more commonly, at a temperature above its melting point.

After the polyamide and rubber are intimately mixed, curative is added if needed. Heating and masticating at vulcanization temperatures are generally adequate to complete the cross-link formation in a few minutes or less, but if shorter times are desired, higher temperatures may be used. A suitable range of temperatures for cross-link formation is from about the melting temperature of the polyamide to the decomposition temperature of the rubber which range commonly is from about 150° C. to 270° C. with the maximum temperature varying somewhat depending on the type of rubber, the presence of antidegradants and the mixing time. Typically, the range is from about 160° C. to 250° C. A preferred range of temperatures is from about 180° C. to about 230° C. To obtain thermoplastic compositions, it is important that mixing continues without interruption until cross-linking occurs. If appreciable cross-linking is allowed after mixing has stopped, a thermoset unprocessable composition may be obtained. A few simple experiments within the skill of the art utilizing available rubbers and curative systems will suffice to determine their applicability for the preparation of the improved products of this invention.

Methods other than the dynamic vulcanization of rubber polyamide blends can be utilized to prepare compositions of the invention. For example, the rubber can be fully vulcanized in the absence of the polyamide, either dynamically or statically, powdered, and mixed with the polyamide at a temperature above the melting or softening point of the polyamide. Provided that the cross-linkd rubber particles are small, well dispersed and in an appropriate concentration, the compositions within the invention are easily obtained by blending cross-linked rubber and polyamide. Accordingly, the term "blend" herein means a mixture comprising well dispersed small particles of cross-linked rubber. A mixture which is outside of the invention because it contains poorly dispersed or too large rubber particles can be comminuted by cold milling (to reduce particle size to below about 50μ) preferably below 20μ and more preferably to below 5μ. After sufficient comminution or pulverization, a composition of the invention is obtained. Frequently, the case of poor dispersion or too large rubber particles is visibly obvious to the naked eye and observable in a molded sheet. This is especially true in the absence of pigments and fillers. In such a case, pulverization and remolding give a sheet in which aggregates of rubber particles or large particles are not obvious or are far less obvious to the naked eye and mechanical properties are greatly improved.

The compositions of the invention are all processable in an internal mixer, to products which, upon transferring at temperatures above the softening or crystallizing points of the polyamide phase, to the rotating rolls of a rubber mill, form continuous sheets. The sheets are reprocessable in the internal mixer, after reaching temperatures above the softening or melting points of the polyamide phase. The material is again transformed to the plastic state (molten state of the polyamide phase) but upon passing the molten product through the rolls of the rubber mill a continuous sheet again forms. In addition, a sheet of thermoplastic composition of this invention can be cut into pieces and compression molded to give a single smooth sheet with complete knitting or fusion between the pieces. It is in the foregoing sense that "thermoplastic" will be herein understood. In addition, the elastoplastic compositions of the invention are further processable to the extent that articles may be formed therefrom by extrusion or injection molding.

Where the determination of extractables is an appropriate measure of the state of cure, the improved elastoplastic compositions are produced by cross-linking the blends to the extent that the composition contains no more than about twenty percent by weight of rubber extractable at room temperature by a solvent which dissolves the uncured rubber, and preferably to the extent that the composition contains less than four percent by weight extractable and more preferably less than two percent by weight extractable. In general, with nonself-curing rubber, the less extractables the better are the properties, whereas, with self-curing rubber, respectable properties are obtained with extractables as high as twenty percent, but with either nonself-curing rubber or self-curing rubber the more preferable compositions comprise low quantities of extractable rubber. Gel content reported as percent gel is determined by the procedure of U.S. Pat. No. 3,203,937 which comprises determining the amount of insoluble polymer by soaking the specimen for 48 hours in a solvent for the rubber at room temperature and weighing the dried residue and making suitable corrections based upon knowledge of the composition. Thus, corrected initial and final weights are obtained by subtracting from the initial weight, the weight of soluble components, other than the rubber, such as extender oils, plasticizers and components of the polyamide soluble in organic solvent. Any insoluble pigments, fillers, etc., are subtracted from both the initial and final weights.

To employ cross-link density as the measure of the state of cure which characterizes the improved elastoplastic compositions, the blends are cross-linked to the extent which corresponds to cross-linking the same rubber as in the blend statically cross-linked under pressure in a mold with such amounts of the same curative if present as in the blend and under such conditions of time and temperature to give an effective cross-link density greater than about $3 \times 10^{-5}$ moles per milliliter of rubber and preferably greater than about $5 \times 10^{-5}$ or even more preferably $1 \times 10^{-4}$ moles per milliliter of rubber. The blend is then dynamically cross-linked under similar conditions (with the same amount of curative, when present, based on the rubber content of the blend) as was required for the rubber alone. The cross-link density so determined may be regarded as a measure of the amount of vulcanization which gives the improved thermoplastics. However, it should not be assumed, from the fact that the amount of curative is based on the rubber content of the blend and is that amount which gives with the rubber alone the aforesaid cross-link density that the curative does not react with the polyamide or that there is no reaction between the polyamide and rubber. There may be highly significant reactions involved but of limited extent. However, the assumption that the cross-link density determined as described provides a useful approximation of the cross-link density of the elastoplastic compositions is consistent with the thermoplastic properties and with the fact that a large proportion of the polyamide can be removed from the composition by extraction with a solvent for the polyamide such as formic acid.

The cross-link density of the rubber is determined by equilibrium solvent swelling using the Flory-Rehner equation, *J. Rubber Chem. and Tech.*, 30, p. 929. The appropriate Huggins solubility parameters for rubber-solvent pairs used in the calculation were obtained from the review article by Sheehan and Bisio, *J. Rubber Chem. & Tech.*, 39, 149. If the extracted gel content of the vulcanized rubber is low, it is necessary to use the correction of Bueche wherein the term $v_r^{\frac{1}{3}}$ is multiplied by the gel fraction (% gel/100). The cross-link density is half the effective network chain density $v$ determined in the absence of polyamide. The cross-link density of the vulcanized blends will, therefore, be hereinafter understood to refer to the value determined on the same rubber as in the blend in the manner described. Still more preferred compositions meet both of the aforedescribed measures of state of cure, namely, by estimation of cross-link density and percent of rubber extractable.

Rubber satisfactory for the practice of the invention comprise essentially random noncrystalline, rubbery polymer selected from the group consisting of a homopolymer of 1,3-butadiene, a copolymer of 1,3-butadiene or isoprene copolymerized with vinylarene monomer or vinyl nitrile monomer, such as styrene, vinyl pyridine, acrylonitrile, or methacrylonitrile, or mixtures of said homopolymer with one or more of said copolymers or mixtures of two or more said copolymers. Commercially available rubbers suitable for the practice of the invention are described in Rubber World Blue Book, 1975 Edition, Materials and Compounding Ingredients for Rubber as follows: Nitrile Rubber, pages 416–430, Polybutadiene Rubber, pages 431–432, and Styrene Butadiene Rubber, pages 452–460. Copolymers of 1,3-butadiene and about 15–60% acrylonitrile commonly called nitrile rubber are preferred. Both nonself-curing and self-curing nitrile rubbers are suitable in the practice of the invention. Nonself-curing nitrile rubbers as the name implies requires the presence of curatives to cross-link the rubber under processing temperatures to the extent that the gel content of the rubber is at least about 80 percent or more. Self-curing nitrile as the name indicates will cross-link under processing temperatures in the absence of curatives (other than curatives which may be inherently present) to the extent that the gel content of the rubber is at least about 80 percent or more. Compositions of the invention comprising blends in which the rubber component is self-curing nitrile rubber generally exhibit superior tensile strengths and consequently are preferred. Blends comprising self-curing nitrile rubber may be cross-linked further by the use of conventional curatives as hereinafter described which use generally results in a further increase in the tensile strength of the resulting composition.

Whether a nitrile rubber is self-curing or nonself-curing is not dependent on acrylonitrile content or Mooney Viscosity but appears to be an inherent property of certain rubbers. A convenient means for determining whether a nitrile rubber is self-curing comprises masticating the rubber at 225° C. in a Brabender mixer and observing its tendency to scorch. Self-curing nitrile rubbers generally scorch under the aforesaid conditions within 2–8 minutes, whereas, nonself-curing rubbers generally may be subjected to the aforesaid treatment for twenty minutes or more without scorching. Scorching as used above means the rubber loses its ability to maintain a continuous fluid mass in the mixer but instead crumbles into discrete particles with some of the particulate crumbs discharging from the throat of the mixer if the ram is lifted while mixing is continued. The scorched rubber or the rubber having been masticated for twenty minutes as described is dumped from mixer, compression molded at 230° C. for five minutes, and the gel content determined by extraction in dichloromethane at room temperature. A self-curing rubber will have a gel content of about 80 percent or more (weight extractable of 20 percent or less) whereas, a nonself-curing rubber will have a gel content of less than 80 percent.

Suitable thermoplastic polyamides (nylons) comprise crystalline or resinous, high molecular weight solid polymers including copolymers and terpolymers having recurring amide units within the polymer chain. Polyamides may be prepared by polymerization of one or more epsilon lactams such as caprolactam, pyrrolidione, lauryllactam and aminoundecanoic lactam, or amino acid, or by condensation of dibasic acids and diamines. Both fiber-forming and molding grade nylons are suitable. Examples of such polyamides are polycaprolactam (nylon-6), polylauryllactam (nylon 12), polyhexamethyleneadipamide (nylon-6,6), polyhexamethyleneazelamide (nylon-6,9), polyhexamethylenesebacamide (nylon-6,10), polyhexamethyleneisophthalamide (nylon-6,IP) and the condensation product of 11-aminoundecanoic acid (nylon 11). Additional examples of satisfactory polyamides (especially those having a softening point below 275° C.) are described in Kirk-Othmer, *Encyclopedia of Chemical Technology*, V. 10, page 919, and *Encyclopedia of Polymer Science and Technology*, Vol. 10, pages 392–414. Commercially available thermoplastic polyamide may be advantageously used in the practice of the invention, with linear crystalline polyamide having a softening point or melting point between 160°–230° C. being preferred.

Moreover, the particular results obtained by the aforedescribed dynamic curing process are a function of the particular rubber curing system selected. The curatives and the curative systems conventionally used to vulcanize diene rubbers are utilizable for preparing the improved thermoplastics of the invention. Any curative or curative system applicable for vulcanization of diene rubbers may be used in the practice of the invention, for example, peroxide, azide, quinoid or accelerated sulfur vulcanization systems. The combination of a maleimide and a peroxide or disulfide accelerator can be used. For satisfactory curatives and curative systems, reference is made to columns 3–4 of U.S. Pat. No. 3,806,558, which disclosure is incorporated herein by reference. Sufficient quantities of curatives are used to achieve essentially complete cure of the rubber as determined by the increase in tensile strength, by the cross-link density, by the sol content (percent extractables), or combination thereof. Excessive quantities of curatives should be avoided because quantities well beyond the amount necessary to fully cure the rubber can result in diminution of properties, for example, a reduction in ultimate elongation. Peroxide curatives are advantageously used in reduced quantities in conjunction with other curatives such as sulfur, multifunctional acrylate or methacrylate co-agents or bismaleimide providing the total amount of curatives is sufficient to vulcanize fully the rubber. High energy radiation is also utilizable as the curative means. Dimethylolphenolic resin curatives can be used provided the temperature is high enough or activators are used to effect curing of the rubber.

Curative systems comprising phenylene bis-maleimide are especially recommended. Also, particularly recommended are efficient or semi-efficient sulfur curative systems which comprise high accelerator-sulfur ratios as contrasted with conventional sulfur curative systems wherein the amount of sulfur exceeds the amount of the accelerator.

One aspect of the invention comprises adding an inert plasticizer to the blend which plasticizer extends the range of proportions of polyamide in the composition while retaining elastoplasticity. For example, without inert plasticizer the weight of polyamide cannot exceed the weight of rubber without losing rubberlike elasticity, whereas, with inert plasticizer the weight of polyamide may exceed the weight of rubber so long as the amount of polyamide does not comprise more than 50 weight percent of the total composition. Generally, the quantity of inert plasticizer when present is between 1–30 weight percent but may comprise up to 65 weight percent of the total composition. An "inert plasticizer" means a plasticizer which does not severely reduce the crystallinity of the polyamide. Preferred inert plasticizers have low volatility, i.e., having a boiling point of at least 300° C. More preferred inert plasticizers have vapor pressures of less than 200 mm Hg, more preferably, less than 100 mm Hg, at 250° C. In most applications, it is also necessary that the inert plasticizer has low solubility in water at room temperature. Suitable inert plasticizers are plasticizers selected from the group consisting of phthalate plasticizers, adipate plasticizers, phosphate plasticizers, glycolate plasticizers, sulfonamide plasticizers, trimellitate plasticizers and polymeric type permanent plasticizers. A preferred subclass of plasticizers are selected from the group consisting of phthalate plasticizers, adipate plasticizers, and sulfonamide plasticizers. Phthalate plasticizers especially improve low temperature properties of compounds. Phosphate plasticizers in addition to the plasticizing effect impart flame retardance to the compound. Phenol compounds of at least 200 molecular weight which serves as extenders or inert plasticizers may also be present in the elastoplastic compositions of the invention.

As indicated supra, it is essential to avoid low molecular weight phenol plasticizers because of their adverse effect upon properties. The term "low molecular weight phenol plasticizer" as used herein and the claims means a phenol compound having a molecular weight of less than 200. Examples of such undesirable compounds are resorcinol and hydroquinone which are low molecular weight high solvating phenol compounds. However, phenol compounds of at least 200 molecular weight can be used in the practice of the invention provided they exhibit relatively low solvating effect upon the polyamide, i.e., they do not substantially affect the crystallinity of the polyamide. Suitable phenol compounds are mono-, di, or tri alkylated phenols where the size or the number of the alkyl groups are sufficient to give a molecular weight of greater than 200. Examples of suitable phenolic compounds are 2,4-di-t-butyl phenol, nonyl phenol, decyl phenol, dodecyl phenol, 4,6-dinonyl ortho cresol, 2,4,6-trisopropyl phenol, 2,4,6 tri-t-butyl phenol, and octadecylphenol. Bis-phenols are also satisfactory such as bis-phenol A and 4,4'-butylidenebis(6-tert-butyl-m-cresol).

Examples of suitable plasticizers are dibutyl phthalate, dicyclohexyl phthalate, diethyl phthalate, diisodecyl phthalate, dimethyl phthalate, di(2-ethylhexyl)phthalate, diphenyl phthalate, diundecyl phthalate, mixed $C_7$–$C_{11}$ dialkyl phthalate, butyl benzyl phthalate, benzyl phthalate, di(2-ethylhexyl)adipate, mixed $C_7$–$C_9$ dialkyl adipate, tributoxyethyl phosphate, tributyl phosphate, tricresyl phosphate, triphenyl phosphate, cresyl diphenyl phosphate, 2-ethylhexyl diphenyl phosphate, isodecyl diphenyl phosphate, butyl phthalyl butyl glycolate, methyl phthalyl ethyl glycolate and mixed $C_7$-$C_9$ alkyl trimellitate. Sulfonamide plasticizers comprise a preferred class of plasticizers for polyamides, for example, N-butyl benzylsulfonamide, N-cyclohexyl-p-toluenesulfonamide, o,p-toluenesulfonamide, N-ethyl-o,p-toluenesulfonamide and N-ethyl-o-toluenesulfonamide. For examples of other suitable plasticizers refer to *Encyclopedia of Chemical Technology*, Vol. 10, Plasticizers, page 780–797.

It is essential that the polyamide in the blend retains a substantial part of its original crystallinity. The term "original crystallinity" means the amount of crystallinity of the polyamide prior to blending. The polyamide may lose a small percentage of its original crystallinity as a consequence of preparing a blend by dynamic vulcanization, i.e., the time and temperature conditions to cure the rubber may cause a slight loss in crystallinity. The addition of plasticizer may also reduce the crystallinity of the polyamide, however, low molecular weight phenol plasticizers must be avoided because of their severe affect upon crystallinity since such plasticizers in normal concentrations completely destroy the crystallinity of lower melting polyamide and greatly reduce the crystallinity of higher melting polyamide. Loss of polyamide crystallinity in the blend gives a composition having low load-bearing capacity (low modulus) and poor high temperature stress-strain properties. In addition, the low molecular weight phenol plasticizers fume excessively during processing. Plasticized compositions of the invention comprise blends wherein the polyamide retains at least 50% of its original crystallinity. However, unplasticized compositions are preferred.

Another aspect of the invention comprises adding a rubber antidegradant to the blend prior to dynamic vulcanization. The presence of a rubber antidegradant protects the blend from thermal and/or oxidative degradation resulting in compositions with superior properties. Preferably, the rubber antidegradant is added early in the mixing cycle, and more preferably, for greater effectiveness the antidegradant is masterbatched with the rubber and a portion of the rubber-antidegradant masterbatch is mixed with the polyamide. The polyamide then melts and after complete mixing, the composition is dynamically cured as described above. For suitable rubber antidegradants, refer to Rubber World Blue Book, supra, pgs. 107–140.

The properties of the elastoplastic compositions of this invention may be modified, either before or after vulcanization, by addition of ingredients which are conventional in the compounding of diene rubber, polyamide and blends thereof. Examples of such ingredients include carbon black, silica, titanium dioxide, colored pigments, clay, zinc oxide, stearic acid, accelerators, vulcanizing agents, sulfur, stabilizers, antidegradants, processing aids, adhesives, tackifiers, rubber plasticizers, wax, prevulcanization inhibitors, discontinuous fibers such as wood cellulose fibers and extender oils. The addition of carbon black, rubber plasticizer or both, preferably prior to dynamic vulcanization, are particularly recommended. Preferably, the carbon black and/or rubber plasticizer is masterbatched with the rubber and the masterbatch is mixed with the polyamide. Carbn black improves the tensile strength and rubber plasticizer can improve the resistance to oil swell, heat stability, hysteresis, cost and permanent set of the elastoplastic compositions. Aromatic, naphthenic and paraffinic extender oils are plasticizers for polybutadiene and butadiene-vinylarene type rubbers. Plasticizers can also improve processibility. For suitable extender oils, refer to Rubber World Blue Book, supra, pages 145–190. The quantity of extender oil added depends upon the properties desired, with the upper limit depending upon the compatibility of the particular oil and blend ingredients which limit is exceeded when excessive exuding of extender oil occurs. Typically, 5–75 parts by weight extender oil are added per 100 parts by weight of rubber and polyamide. Commonly about 10 to 60 parts by weight of extender oil are added per 100 parts by weight of rubber in the blend with quantities of about 20 to 50 parts by weight of extender oil per 100 parts by weight of rubber being preferred. Typical additions of carbon black comprise about 20–100 parts by weight of carbon black per 100 parts by weight of rubber and usually about 25–60 parts by weight carbon black per 100 parts total weight of rubber and extender oil. The amount of carbon black which can be used depends, at least in part, upon the type of black and the amount of extender oil to be used. The amount of extender oil depends, at least in part, upon the type of rubber. High viscosity rubbers are more highly oil extendable. If nitrile rubber is used, polyvinylchloride-type plasticizers are commonly used in place of extender oils.

Elastoplastic compositions of the invention are useful for making a variety of articles such as tires, hoses, belts, gaskets, moldings and molded parts. They are particularly useful for making articles by extrusion, injection molding and compression molding techniques. They also are useful for modifying thermoplastic resins, in particular, polyamide resins. The compositions of the invention are blended with thermoplastic resins using conventional mixing equipment. The properties of the modified resin depend upon the amount of elastoplastic composition. Generally, the amount is such that the modified resin contains about 5 to 50 parts by weight of rubber per about 95 to 50 parts total weight of resin.

The stress-strain properties of the compositions are determined in accordance with the test procedures set forth in ASTM D638 and ASTM D1566. An approximate toughness is calculated by an abbreviated Griffith equation $(TS)^2/E$ (TS=tensile strength, E=Young's modulus). For a detailed analysis, refer to *Fracture*, edited by H. Liebowitz, published by Academic Press, New York, 1972, Ch. 6, Fracture of Elastomers by A. N. Gent. The compositions are elastomeric, processable as thermoplastics and reprocessable without the need for reclaiming in contrast to ordinary thermoset vulcanizates. The term "elastomeric" as used herein and the claims means a composition which possesses the property of forcibly retracting within one minute to less than 160% of its original length after being stretched at room temperature to twice its length and held for one minute before release. The aforesaid definition closely parallels the definition for rubber as defined by ASTM Standards, V. 28, p. 756 (D1566) which states:

"A rubber in its modified state, free of diluents, retracts within 1 min. to less than 1.5 times its original length after being stretched at room temperature (20° to 27° C.) to twice its length and held for 1 min. before release."

Especially preferred compositions of the invention are rubbery compositions having tension set values of about 50% or less. More preferred compositions are rubbery compositions having a Shore D hardness of 60 or below or a 100% modulus of 160 Kg./cm² or less or a Young's modulus below 2000 Kg./cm² but at least 200 Kg./cm² and more preferably at least 500 Kg./cm².

DESCRIPTION OF PREFERRED EMBODIMENTS

A typical procedure for the preparation of elastoplastic compositions of the invention comprises mixing, in the indicated proportions, rubber and polyamide in a Brabender mixer with an oil bath temperature as indicated for a time sufficient, usually between 2-6 minutes, to melt the polyamide and to form a blend. Hereinafter, mix temperature will be understood to be the temperature of the oil bath with the realization that the actual temperature of the mixture may vary. Curatives are added, if needed, to cross-link the rubber, and mixing is continued until the maximum Brabender consistency is reached, usually between 1-5 minutes, and for an additional two minutes thereafter. The order of mixing can vary but all the ingredients should be added and mixed before substantial vulcanization occurs. The vulcanized but thermoplastic composition is removed, sheeted on a mill (or sheeted by compression in a press), returned to the Brabender and mixed at the same temperature for two minutes. The material is again sheeted and then compression molded at 200°-270° C. and cooled below 100° C. under pressure before removal. Properties of the molded sheet are measured and recorded. The aforesaid procedure is followed in the examples below unless stated otherwise.

Ingredients used to illustrate the invention are N'-(1,3-dimethylbutyl)-N'-(phenyl)-p-phenylenediamine (Santoflex ® 13 antidegradant), Polymerized 1,2-dihydro-2,2,4-trimethylquinoline (Flectol ® H antidegradant), m-phenylene bis-maleimide (HVA-2), 2-(morpholinothio)-benzothiazole, (Santocure ® - MOR)accelerator, tetramethylthiuram disulfide (TMTD), and 2-bis-benzothiazyl disulfide (MBTS); All ingredients including polyamide and rubber shown in the Tables are in parts by weight.

The data of Table I illustrate compositions of the invention comprising 66.7 parts by weight nitrile rubber and 33.3 parts by weight polyamide. The polyamide is Nylon 6,9, poly(hexamethyleneazelaicamide) m.p. 210° C. which is a condensation product of hexamethylenediamine and azelaic acid or ester. The nitrile rubber designated A is a nonself-curing copolymer of 1,3-butadiene and 41 weight percent acrylonitrile having a Mooney Viscosity (ML+4) of 60. The nitrile rubber designated B is a self-curing copolymer of 1,3-butadiene and 41 weight percent acrylonitrile having a Mooney Viscosity (ML 1+4) of 80. Nitrile rubber B when heated alone at 225° C. self-cures (scorches within 5 minutes) to the extent that the gel content of the rubber is about 85 percent, (15 weight percent of the rubber is extractable in dichloromethane).

Elastoplastic compositions are prepared in accordance to the typical procedure described above with a Brabender temperature of 210° C. and mixing speed of 80 rpm. A rubber antidegradant (0.67 parts by weight Flectol H) is added prior to adding curative (HVA-2). Compositions Stocks 1 and 7 contain no curative, whereas, in Stocks 2-6 and 8-12, the amount of curative, HVA-2, is varied.

The data show that the properties of the compositions containing nonself-curing rubber are significantly improved with the addition of curative. An improvement of 100% or more in tensile strength (TS), is obtained with the addition of 0.67 parts by weight of curative, and the properties continue to increase with increasing curative level. Toughness, $(TS)^2/E$, increases upon addition of curative and continues to improve up to 5.33 parts by weight of curative. Stock 7 illustrates a composition of the invention prepared with self-curing nitrile rubber which composition exhibits excellent properties having especially high toughness. The addition of curative results in only slightly stronger but substantially more rigid compositions. The toughness of the compositions decreases with increasing curative level.

TABLE I

| Stock No. | Nitrile Rubber | HVA-2, Parts by wt. | TS, Kg./cm² | 100% M, Kg./cm² | E, Kg./cm² | (TS)²/E, Kg./cm² | UE, Percent |
|---|---|---|---|---|---|---|---|
| 1 | A | 0 | 49 | 43 | 100 | 24 | 180 |
| 2 | A | 0.67 | 111 | 102 | 477 | 26 | 120 |
| 3 | A | 1.33 | 144 | 115 | 720 | 29 | 170 |
| 4 | A | 2.67 | 146 | 122 | 669 | 32 | 150 |
| 5 | A | 5.33 | 174 | 153 | 876 | 35 | 130 |
| 6 | A | 10.67 | 177 | 163 | 1194 | 26 | 110 |
| 7 | B | 0 | 199 | 95 | 491 | 81 | 360 |
| 8 | B | 0.17 | 210 | 103 | 601 | 73 | 330 |
| 9 | B | 0.35 | 212 | 105 | 611 | 74 | 330 |
| 10 | B | 0.67 | 233 | 116 | 908 | 60 | 310 |
| 11 | B | 1.33 | 236 | 120 | 957 | 58 | 340 |
| 12 | B | 2.67 | 200 | 140 | 1271 | 31 | 200 |

Elastoplastic compositions of the invention comprising 15 different nonself-curing nitrile rubbers are illustrated in Table II. The polyamide is the same as in Table I and compositions are prepared in the same manner. All compositions contain 66.7 parts by rubber, 33.3 parts by weight Nylon-6,9, 0.67 parts Flectol H with the cured compositions containing in addition 0.67 parts by weight HVA-2. The acrylonitrile (AN) content and Mooney Viscosity of the nitrile rubber are shown in the table. The odd numbered stocks are controls containing antidegradant but no curative and the even numbered stocks illustrate compositions of the invention in which the rubber is cross-linked by masticating with curative at 210° C. for 6-8 minutes. The compositions are compression molded into sheets about 2-3 mm thick at 255° C. and cooled under pressure before removal. The gel content (weight percent insoluble in methylenechloride) of the compositions containing no curative were determined with the same rubber but in the absence of polyamide under conditions described above. The cross-link density of the composition containing curative is greater than $7 \times 10^{-5}$ moles per milliliter of rubber. The data show that addition of curative results in a substantial increase in tensile strength, generally, 100 percent or more. The compositions containing cured rubber also have greater resistance to oil swell. The percent oil swell represents the dimensional increase in a specimen soaked in #3 oil at 150° C. for 48 hours. The data indicate that compositions of the invention may be prepared from all nitrile rubbers, regardless of the acrylonitrile content of Mooney Viscosity of the rubber.

scribed above. The cross-link density of the compositions containing curative is greater than $7 \times 10^{-5}$ moles per milliliter of rubber. The data indicate that the self-

TABLE II

| Stock No. | Nitrile Rubber AN Content, Wt.-% | Mooney Visc., ML 1 + 4 (100° C.) | Gel Content, % | TS, Kg./cm$^2$ | 100% M, Kg./cm$^2$ | (TS)$^2$/E, Kg./cm$^2$ | E, Kg./cm$^2$ | UE, Percent | Oil Swell, percent |
|---|---|---|---|---|---|---|---|---|---|
| 1 | 22 | 70 | 59 | 40 | — | 21 | 75 | 70 | 42 |
| 2 | | | | 94 | 77 | 23 | 378 | 150 | 25 |
| 3 | 28 | 50 | 61 | 32 | — | 12 | 84 | 80 | 38 |
| 4 | | | | 85 | 78 | 22 | 328 | 130 | 25 |
| 5 | 33 | 25 | 48 | 17 | 17 | 9 | 34 | 190 | 14 |
| 6 | | | | 76 | 70 | 21 | 281 | 120 | 9 |
| 7 | 33 | 40 | 74 | 58 | — | 33 | 102 | 80 | 20 |
| 8 | | | | 91 | — | 8 | 1085 | 50 | 17 |
| 9 | 33 | 55 | 71 | 59 | 56 | 29 | 120 | 130 | 21 |
| 10 | | | | 136 | 101 | 35 | 536 | 200 | 16 |
| 11 | 39 | 47 | 53 | 22 | 22 | 12 | 39 | 150 | 14 |
| 12 | | | | 75 | 70 | 19 | 291 | 110 | 13 |
| 13 | 39 | 50 | 64 | 46 | 42 | 18 | 120 | 130 | 9 |
| 14 | | | | 144 | 94 | 40 | 524 | 240 | 7 |
| 15 | 39 | 57 | 62 | 44 | 41 | 18 | 109 | 140 | 14 |
| 16 | | | | 134 | 112 | 20 | 891 | 180 | 14 |
| 17 | 39 | 80 | 70 | 74 | 67 | 26 | 210 | 130 | 17 |
| 18 | | | | 167 | 121 | 21 | 1303 | 240 | 12 |
| 19 | 41 | 60 | 45 | 49 | 43 | 24 | 100 | 180 | 14 |
| 20 | | | | 106 | 96 | 19 | 577 | 120 | 13 |
| 21 | 41 | 80 | 66 | 73 | 63 | 29 | 185 | 160 | 11 |
| 22 | | | | 128 | 111 | 15 | 1092 | 160 | 11 |
| 23 | 45 | 48 | 52 | 50 | 39 | 34 | 74 | 220 | 13 |
| 24 | | | | 94 | 91 | 17 | 513 | 110 | 10 |
| 25 | 45 | 60 | 47 | 41 | 40 | 15 | 110 | 170 | 2 |
| 26 | | | | 131 | 103 | 33 | 524 | 190 | 0 |
| 27 | 45 | 60 | 33 | 75 | 54 | 37 | 153 | 280 | 9 |
| 28 | | | | 136 | 108 | 26 | 716 | 210 | 7 |
| 29 | 51 | 55 | 61 | 65 | — | 22 | 195 | 100 | 7 |
| 30 | | | | 134 | — | 16 | 1102 | 90 | 6 |

Elastoplastic compositions of the invention comprising 8 different self-curing rubbers are illustrated in Table III. The odd numbered stocks contain 66.7 parts by weight nitrile rubber, 33.3 parts by weight nylon 6,9 and 0.67 parts by weight Flectol H. The even numbered stocks contain the same ingredients as the odd numbered stocks but, in addition, contain 0.67 parts by weight HVA-2. All stocks are masticated in a Brabender mixer at 210° C. for a total mix time of 6-8 minutes via the typical procedure as explained above. The compositions are compression molded into sheets about 2-3 mm thick at 255° C. and cooled under pressure before removal. The gel content (weight percnt insoluble in methylenechloride) of the compositions containing no curative were determined with the same rubber but in the absence of polyamide under conditions decuring rubbers give thermoplastic elastomeric compositions having excellent properties without curatives. The addition of curative increases the tensile strength, 100% and Young's modulus. The properties of the compositions are similar regardless of the acrylonitrile content or Mooney Viscosity of the nitrile rubber in the blend.

TABLE III

| Stock No. | Nitrile Rubber AN Content, Wt.-% | Mooney Visc. ML 1 + 4 (100° C.) | Gel Content, % | TS, Kg./cm$^2$ | 100% M, Kg./cm$^2$ | E, Kg./cm$^2$ | (TS)$^2$/E, Kg./cm$^2$ | UE, Percent | Oil Swell, percent |
|---|---|---|---|---|---|---|---|---|---|
| 1 | 21 | 80 | 83 | 150 | 86 | 526 | 43 | 280 | 29 |
| 2 | | | | 157 | 104 | 813 | 30 | 230 | 26 |
| 3 | 29 | 30 | 81 | 166 | 98 | 379 | 73 | 250 | 27 |
| 4 | | | | 217 | 117 | 1014 | 46 | 290 | 21 |
| 5 | 33 | 80 | 83 | 172 | 90 | 500 | 59 | 300 | 15 |
| 6 | | | | 198 | 115 | 1201 | 33 | 290 | 16 |
| 7 | 33 | 95 | 91 | 179 | 91 | 365 | 88 | 300 | 16 |
| 8 | | | | 197 | 114 | 1004 | 39 | 250 | 18 |
| 9 | 41 | 50 | 89 | 172 | 96 | 432 | 68 | 290 | 11 |
| 10 | | | | 218 | 116 | 919 | 52 | 320 | 7 |
| 11 | 41 | 80 | 85 | 199 | 95 | 491 | 81 | 360 | 6 |
| 12 | | | | 236 | 120 | 1238 | 45 | 360 | 5 |
| 13 | 41 | 95 | 86 | 138 | 87 | 300 | 63 | 230 | 10 |
| 14 | | | | 157 | 107 | 810 | 30 | 240 | 13 |
| 15 | 43 | 95 | 93 | 184 | 95 | 399 | 85 | 310 | 10 |
| 16 | | | | 209 | 116 | 902 | 48 | 270 | 13 |

The data of Table IV illustrate compositions comprising different proportions of nitrile rubber and polyamide resin. The nitrile rubber is a self-curing rubber containing 43 weight percent acrylonitrile having a Mooney Viscosity of 95. The polyamide is Nylon 6,9. The procedure for preparing the compositions is the same as in Tables I-III. The data show that tensile strength and modulus decrease with increasing proportion of rubber.

The data further show that the toughness, $(TS)^2/E$, of the compositions are essentially the same up to 40 parts by weight rubber with a substantial jump in toughness when the amount of rubber is 50 parts by weight and from that point on toughness increases with rubber content.

TABLE IV

| | 1 | 2 | 3 | 4 | 5 | 6 | 7 | 8 | 9 |
|---|---|---|---|---|---|---|---|---|---|
| Nitrile rubber | 20 | 30 | 40 | 50 | 60 | 66.7 | 70 | 75 | 80 |
| Nylon 6,9 | 80 | 70 | 60 | 50 | 40 | 33.3 | 30 | 25 | 20 |
| Flectol H | 0.2 | 0.3 | 0.4 | 0.5 | 0.6 | 0.67 | 0.7 | 0.75 | 0.8 |
| HVA-2 | 0.2 | 0.3 | 0.4 | 0.5 | 0.6 | 0.67 | 0.7 | 0.75 | 0.8 |
| mix speed, rpm | 80 | 80 | 80 | 80 | 80 | 80 | 80 | 80 | 80 |
| mix temp, °C. | 210 | 210 | 210 | 210 | 210 | 210 | 210 | 210 | 210 |
| Ult. tensile strength, Kg./cm$^2$ | 358 | 300 | 252 | 234 | 219 | 202 | 190 | 180 | 154 |
| 100% modulus, Kg./cm$^2$ | 308 | 271 | 214 | 160 | 129 | 108 | 135 | 94 | 75 |
| Young's Modulus, Kg./cm$^2$ | 6311 | 4204 | 3533 | 1959 | 1232 | 785 | 654 | 463 | 228 |
| Ult. Elongation, % | 240 | 240 | 260 | 300 | 320 | 320 | 190 | 240 | 250 |
| $(TS)^2/E$, Kg./cm$^2$ | 20 | 21 | 18 | 28 | 39 | 52 | 55 | 70 | 104 |
| tension set, % | 86 | 83 | 73 | 58 | 44 | 33 | 32 | 21 | 16 |

Elastoplastic compositions of the invention containing different polyamides are illustrated in Table V. The polyamide is poly(hexamethyleneisophthalamide) m.p. 200° C., Nylon IP, in Stocks 1 and 2; poly(caprolactam) m.p. 216° C., Nylon 6, in Stocks 3 and 4; copolymer of Nylon 6 and Nylon 6,6, m.p. 243° C., Nylon 6-6,6 in Stock 5; and polyhexamethyleneadipicamide, m.p. 264° C., Nylon 6,6 in Stocks 6 and 7. The compositions are prepared by the typical procedure.

TABLE V

| | 1 | 2 | 3 | 4 | 5 | 6 | 7 |
|---|---|---|---|---|---|---|---|
| Nitrile rubber | 60[1] | 60[1] | 60[1] | 66.7[1] | 60[2] | 60[3] | 60[3] |
| Nylon IP | 40 | 40 | — | — | — | — | — |
| Nylon 6 | — | — | 40 | 33.3 | — | — | — |
| Nylon 6-6,6 | — | — | — | — | 40 | — | — |
| Nylon 6,6 | — | — | — | — | — | 40 | 40 |
| HVA-2 | 0 | 2 | 2 | 0.67 | 0.6 | — | 1.2 |
| Antidegradant | 0.6[4] | 0.6[4] | 0.6[4] | — | 0.6[5] | 1.2[5] | 1.2[5] |
| mixing temp °, C. | 220 | 220 | 220 | 220 | 250 | 270 | 270 |
| UTS, Kg./cm$^2$ | 179 | 271 | 218 | 219 | 159 | 74 | 216 |
| 100% modulus, Kg./cm$^2$ | 162 | 217 | 177 | 136 | 143 | — | 184 |
| Young's modulus, Kg./cm$^2$ | 1707 | 3341 | 1687 | 1034 | 1546 | 822 | 3305 |
| Ult. Elongation, % | 150 | 190 | 180 | 260 | 140 | 70 | 180 |
| $(TS)^2/E$, Kg./cm$^2$ | 19 | 22 | 28 | 46 | 16 | 7 | 14 |
| Shore D hardness | — | — | — | 43 | 46 | 40 | 55 |
| tension set, % | — | — | — | 31 | 49 | — | 45 |

[1]Self-curing nitrile rubber, acrylonitrile content 43 wt. %, Mooney Visc. 95.
[2]Nonself-curing nitrile rubber, acrylonitrile content 45 wt. %, Mooney Visc. 60. Cure system includes 0.15 parts MBTS.
[3]Nonself-curing nitrile rubber, acrylonitrile content 39 wt. %, Mooney Viscosity 50.
[4]Santoflex 13
[5]Flectol H Thermoplastic elastomeric compositions of the invention containing styrene-butadiene rubber are illustrated in Table VI. The rubber is a cold polymerized butadiene-styrene rubber having a target bound styrene of 23.5% and nominal Mooney Viscosity of 52. The compositions, in which the relative proportions of rubber and polyamide are varied, are prepared by the typical procedure as previously described. The data indicate that stronger, more rigid compositions are obtained as the proportion of nylon increases. Contrary to the results obtained with nitrile rubber, increasing the proportion of SBR-rubber does not improve toughness.

TABLE VI

| | 1 | 2 | 3 | 4 | 5 | 6 |
|---|---|---|---|---|---|---|
| SBR-1502 | 80 | 75 | 70 | 66.7 | 60 | 50 |
| Nylon 6,9 | 20 | 25 | 30 | 33.3 | 40 | 50 |
| HVA-2 | 0.8 | 0.75 | 0.7 | 0.67 | 0.6 | 0.5 |
| Flectol H | 0.8 | 0.75 | 0.7 | 0.67 | 0.6 | 0.5 |
| mix speed, rpm | 80 | 80 | 80 | 80 | 80 | 80 |
| mix temp., °C. | 210 | 210 | 210 | 210 | 210 | 210 |
| molding temp.,°C. | 255 | 255 | 255 | 255 | 255 | 255 |
| Ult. tensile strength, Kg./cm$^2$ | 63 | 69 | 86 | 109 | 149 | 187 |
| 100% modulus, Kg./cm$^2$ | 52 | 60 | 75 | 89 | 109 | 152 |
| Young's modulus, Kg./cm$^2$ | 239 | 341 | 534 | 664 | 966 | 1600 |
| Ult. Elong., % | 140 | 130 | 140 | 160 | 200 | 200 |
| $(TS)^2/E$, Kg./cm$^2$ | 17 | 14 | 14 | 18 | 23 | 22 |

Compositions of the invention containing polybutadiene rubber are illustrated in Table VII. The compositions are prepared by the typical procedure.

TABLE VII

|  | 1 | 2 |
|---|---|---|
| Polybutadiene rubber[1] | 66.7 | — |
| Polybutadiene rubber[2] | — | 66.7 |
| Nylon 6,9 | 33.3 | 33.3 |
| Flectol H | 0.67 | 0.67 |
| HVA-2 | 0.67 | 0.67 |
| mix speed, rpm | 80 | 80 |
| mix temp., °C. | 210 | 210 |
| Ult. tensile strength, Kg./cm$^2$ | 98 | 110 |
| 100% modulus, Kg./cm$^2$ | 91 | 94 |
| Young's modulus, Kg./cm$^2$ | 845 | 743 |
| Ult. Elong., % | 120 | 150 |
| (TS)$^2$/E, Kg./cm$^2$ | 11 | 16 |

[1]Nonstaining polybutadiene rubber, 98% cis content, Mooney Viscosity of 41.
[2]Nonstaining, solution polymerized, polybutadiene rubber.

Compositions of the invention containing polyamide plasticizer are illustrated in Table VIII. The compositions are prepared in a Brabender mixer by the typical procedure. The polyamide, nitrile rubber and plasticizer are added simultaneously at a mixing temperature of 215° C. The mixing speed is 150 rpm until the polyamide is melted and the blend is then mixed at 80 rpm for 5 minutes. In stocks containing curative, the curative is added after 2 minutes of the 80 rpm cycle. Specimens are molded at 225°–230° C. All parts by weight.

TABLE VIII

|  | 1 | 2 | 3 | 4 | 5 | 6 |
|---|---|---|---|---|---|---|
| Nitrile rubber[1] | 40 | 40 | 40 | 40 | 40 | 40 |
| Nylon 6,9 | 60 | 60 | 60 | 60 | 60 | 60 |
| Flectol H Antidegradant | 0.4 | 0.4 | 0.4 | 0.4 | 0.4 | 0.4 |
| N-ethyl o,p-toluenesulfonamide | — | — | 20 | 20 | 30 | 40 |
| HVA-2 | — | 0.4 | — | 0.4 | 0.4 | 0.4 |
| Ult. ten. str., Kg./cm$^2$ | 257 | 301 | 193 | 243 | 217 | 164 |
| 100% modulus, Kg./cm$^2$ | 228 | 233 | 144 | 157 | 133 | 117 |
| Young's modulus, Kg./cm$^2$ | 3905 | 4509 | 1490 | 1748 | 1451 | 1300 |
| (TS)$^2$/E, Kg./cm$^2$ | 17 | 20 | 25 | 34 | 32 | 21 |
| Ult. Elong., % | 210 | 300 | 250 | 310 | 340 | 280 |
| Shore D hardness | 61 | 61 | 49 | 50 | 45 | 43 |
| tension set, % | 68 | 73 | 51 | 56 | 53 | 52 |

[1]Self-curing nitrile rubber, acrylonitrile content 43 wt. %, Mooney Viscosity 95.

The data indicate that stiff, hard, nonelastomeric compositions (Stocks 1 and 2) containing polyamide as the major component may be modified by addition of inert plasticizer to give flexible, soft, tougher elastomeric compositions (Stocks 3–6) with Young's modulus less than 2000 Kg./cm$^2$, Shore D hardness of 50 or less and tension set of less than 60%.

TABLE IX

|  | 1 | 2 | 3 | 4 | 5 | 6 | 7 |
|---|---|---|---|---|---|---|---|
| Nitrile rubber | 60[1] | 60[1] | 60[1] | 60[1] | 60[2] | 60[2] | 60[2] |
| Nylon[3] 6-6,6,6-10 | 40 | 40 | 40 | 40 | 40 | 40 | 40 |
| Zinc oxide | — | 3 | — | — | — | 2.1 | — |
| Stearic acid | — | 0.3 | — | — | — | 1.5 | — |
| TMTD | — | 1.2 | — | — | — | 0.24 | — |
| Santocure MOR | — | 0.6 | — | — | — | 0.48 | — |
| Sulfur | — | 0.12 | — | — | — | 0.72 | — |
| HVA-2 | — | — | 1.8 | — | — | — | 1.8 |
| MBTS | — | — | 0.45 | — | — | — | 0.45 |
| Peroxide[4] | — | — | — | 0.3 | — | — | — |
| TS, Kg./cm$^2$ | 32 | 85 | 87 | 81 | 69 | 125 | 111 |
| 100% M, Kg./cm$^2$ | 25 | 75 | 38 | 62 | 31 | 37 | 48 |
| Young's modulus, Kg./cm$^2$ | 63 | 348 | 174 | 174 | — | — | — |
| Ult. Elongation, % | 290 | 160 | 310 | 220 | 370 | 480 | 390 |
| (TS)$^2$/E, Kg./cm$^2$ | 16 | 21 | 116 | 38 | — | — | — |
| Tension set, % | 72 | 15 | 51 | 31 | 47 | 25 | 23 |
| Shore D hardness | 17 | 35 | 28 | 32 | 23 | 28 | 32 |

[1]Nonself-curing nitrile rubber, acrylonitrile content 39 wt. %, Mooney Viscosity 50, gel content under cure conditions sans curative 65%.
[2]Nitrile rubber, copolymer of isoprene and 34 wt. % acrylonitrile.
[3]Terpolymer of Nylon 6, (50%), Nylon 6-6 (31%) and Nylon 6-10 (19%) m.p. 160° C.
[4]2,5-Dimethyl-2,5-bis(t-butylperoxy)hexane (90% active).

Compositions of the invention with sulfur and peroxide curative systems are illustrated in Table IX. The compositions are prepared by the typical procedure except the mixing temperature is 180° C. and the mixing speed in Stocks 1–4 is 150 rpm until the nylon is melted after which the mixing speed is 80 rpm. The molding temperature is 220° C. Stocks 1 and 5 are controls containing no curative. Stocks 2 and 6 illustrate compositions prepared with an accelerated sulfur curative system. Stocks 3 and 7 illustrate compositions made using an activated m-phenylene bismaleimide curative system. Stock 4 illustrates a composition with a peroxide curative. The compositions of Stocks 2–4 and 6–7 are thermoplastic elastomers and exhibit improved properties.

Compositions of the invention are compared to compositions containing low molecular weight phenol plasticizers in Table X. The compositions are prepared by the typical procedure in a Brabender mixer except in Stocks 1–7 the mixing temperature is 165° C. at 80 rpm and the molding temperature is 180° C. and in Stocks 8–11 the mixing temperature is 225° C. at 80 rpm and the molding temperature is 250° C. Stock 1 is a control which shows that compositions containing polyamide as the major component and no plasticizer are not elastomeric (tension set of 67%). Stocks 2 and 3 show that the addition of 25 parts of plasticizer reduces tension set into the elastomeric range (less than 50%) but that the effect on the load-bearing capacity of the compositions are markedly different depending upon the plasticizer used. Stock 2, a composition of the invention containing a sulfonamide plasticizer, has more than 80 times the load-bearing capacity than Stock 3, a composition containing phenol plasticizer (resorcinol). Stock 2 has a Young's modulus of 799 Kg./cm$^2$ compared to Stock 3 which has a Young's modulus of only 9.9 Kg./cm$^2$. Differential thermal analysis shows that the phenol plasticizer has completely destroyed the crystallinity of the polyamide, whereas, the composition containing sulfonamide plasticizer retains a substantial portion of the polyamide crystallinity which retention of crystallinity indicates that the composition will retain its stress-strain properties at elevated temperatures. Stock 4 illustrates a composition of the invention which exhibits good elasticity without any phenol plasticizer being present. Stocks 5–7 contain the same ingredients as Stock 4 except in addition they contain 2, 5 and 10 parts resorcinol, respectively. The data show that when the amount of rubber exceeds the amount of polyamide that an elastomeric composition is obtained without phenol plasticizer.

TABLE X

|  | 1 | 2 | 3 | 4 | 5 | 6 | 7 | 8 | 9 | 10 | 11 |
|---|---|---|---|---|---|---|---|---|---|---|---|
| Nitrile rubber[1] | 40 | 40 | 40 | — | — | — | — | — | — | — | — |
| Nitrile rubber[2] | — | — | — | 60 | 60 | 60 | 60 | 65 | 65 | 65 | 65 |
| Nylon 6-6,6,6-10 | 60 | 60 | 60 | 40 | 40 | 40 | 40 | — | — | — | — |
| Nylon 6 | — | — | — | — | — | — | — | 35 | 35 | 35 | 35 |
| Flectol-H | — | — | — | — | — | — | — | 1 | 1 | 1 | 1 |
| N-ethyl o,p-toluene sulfonamide | — | 25 | — | — | — | — | — | — | 10 | — | — |
| Resorcinol | — | — | 25 | — | 2 | 5 | 10 | — | — | 10 | — |
| Hydroquinone | — | — | — | — | — | — | — | — | — | — | 10 |
| TMTD | 0.81 | 0.81 | 0.81 | 1.2 | 1.2 | 1.2 | 1.2 | — | — | — | — |
| Zinc Oxide | 2 | 2 | 2 | 3 | 3 | 3 | 3 | — | — | — | — |
| HVA - 2 | — | — | — | — | — | — | — | 0.163 | 0.163 | 0.163 | 0.163 |
| UTS, Kg.cm$^2$ | 149 | 100 | 88 | 105 | 120 | 98 | 82 | 192 | 156 | 131 | 140 |
| M$_{100}$, Kg./cm$^2$ | 128 | 63 | 7.4 | 92 | 52 | 16 | 13 | 144 | 126 | 90 | 91 |
| E, Kg./cm$^2$ | 1314 | 799 | 9.9 | 602 | 149 | 21 | 11 | 851 | 820 | 453 | 443 |
| Elong., % | 210 | 280 | 1040 | 160 | 240 | 450 | 600 | 200 | 180 | 260 | 280 |
| Ten. set, % | 67 | 42 | 21 | 23 | 27 | 22 | 12 | 28 | 24 | 18 | 19 |
| DTA m.p., °C. |  |  |  |  |  |  |  |  |  |  |  |
| Peak | 141 | 131 | none | 145 | 135 | none | none | 220 | 216 | 191 | 195 |
| Final | 156 | 146 | none | 160 | 153 | none | none | 232 | 228 | 200 | 204 |
| Heat of fusion, H$_f$ Cal./gr. | 3.51 | 2.44 | 0 | 2.32 | 1.93 | 0 | 0 | 5.72 | 5.36 | 4.05 | 4.43 |

[1] Nonself-curing rubber same as Stock 13, Table II.
[2] Self-curing rubber same as Stock 5, Table III.

The data further show that a low molecular weight phenol plasticizer has a drastic effect upon the load-bearing properties of the composition with as little as 2 parts by weight causing a substantial reduction in modulus and that 5 parts by weight is sufficient to completely destroy the polyamide crystallinity. The Young's modulus of Stock 4 containing no plasticizer is 602 Kg./cm$^2$, whereas, the Young's moduli of Stocks 5, 6 and 7 containing 2, 5 and 10 parts by weight of resorcinol are 149, 21 and 11 Kg./cm$^2$, respectively. Stocks 8–11 illustrate the effect of plasticizer in compositions containing a high melting, highly crystalline polyamide. Stock 8 shows elastoplastic compositions without plasticizer. Stock 9 shows that the addition of 10 parts of sulfonamide plasticizer results in a slight reduction in Young's modulus, whereas, Stocks 10 and 11 show that the addition of 10 parts of phenol plasticizer results in a large reduction in Young's modulus.

Compositions of the invention containing various plasticizers or extenders are illustrated in Table XI. The compositions contain 50 parts by weight nitrile rubber (same rubber as Stock 5, Table III), 50 parts by weight polyamide (Nylon 6,6-6,6-10; m.p. 160° C.), 2.5 parts by weight zinc oxide, 1 part by weight TMTD, 0.5 parts by weight MBTS and 10 parts by plasticizer or extender, (except for Stock 1, a control containing no plasticizer or extender). The rubber, polyamide and plasticizer or extender are charged to a Brabender mixer and masticated until the polyamide melts and for two minutes thereafter. Zinc oxide is added and mixed for about ½ minute followed by the addition of TMTD and MBTS. Mixing is continued until a maximum consistency is reached (indicative that cure is complete) and for two minutes thereafter. The composition is removed, passed through a roll mill, returned to the mixer and mixed for two more minutes. Test specimen are prepared by compression molding at 200° C. All of the samples are elastomeric having tension set values between about 17 and 33 percent. Other properties of the compositions are tabulated in Table XI.

TABLE XI

| Extender or Plasticizer | UTS, Kg.cm$^2$ | 100% M, Kg./cm$^2$ | E, Kg./cm$^2$ | UE, Percent | Hardness, Shore D | ASTM #3 Oil Swell, % | DTA m.p., °C. peak | DTA m.p., °C. final | Hf., cal./g. |
|---|---|---|---|---|---|---|---|---|---|
| None | 113 | 83 | 521 | 260 | 45 | 7.5 | 152 | 168 | 2.77 |
| Methyl phthalyl ethyl glycolate | 85 | 73 | 420 | 300 | 38 | −0.4 | 155 | 169 | 2.27 |
| Butyl phthalyl butyl glycolate | 83 | 74 | 429 | 180 | 35 | −0.5 | 149 | 161 | 2.65 |
| C$_7$–C$_9$ alkyl trimellitate | 81 | 73 | 411 | 170 | 36 | 0.8 | 150 | 162 | 2.78 |
| Isododecyl diphenyl phosphate | 65 | 60 | 324 | 170 | 35 | −0.4 | 149 | 162 | 2.73 |
| Dioctyl phthalate | 84 | 78 | 489 | 160 | 40 | −0.3 | 153 | 164 | 2.70 |
| C$_7$–C$_9$ adipate | 77 | 70 | 436 | 150 | 35 | −0.6 | 150 | 162 | 2.74 |
| Glycol-dibasic acid polymeric type | 83 | 65 | 344 | 230 | 35 | 3.7 | 154 | 164 | 2.68 |
| Dibutyl sebacate | 75 | 60 | 264 | 200 | 35 | −1.0 | 153 | 162 | 2.47 |
| Soybean oil epoxide | 73 | 72 | 510 | 110 | 38 | 2.9 | 153 | 163 | 2.53 |
| N-ethyl,o,p-toluene sulfonamide | 120 | 84 | 511 | 290 | 38 | −0.1 | 145 | 156 | 2.44 |

TABLE XI-continued

| Extender or Plasticizer | UTS, Kg.cm² | 100% M, Kg./cm² | E, Kg./cm² | UE, Percent | Hardness, Shore D | ASTM #3 Oil Swell, % | DTA m.p., °C peak | DTA m.p., °C final | Hf., cal./g. |
|---|---|---|---|---|---|---|---|---|---|
| Bis-phenol A | 118 | 54 | 615 | 330 | 38 | 5.7 | 144 | 156 | 2.17 |
| Nonyl phenol | 118 | 64 | 284 | 340 | 38 | −0.6 | 149 | 162 | 2.63 |
| 2,5-di(tert-amyl)hydroquinone | 73 | 64 | 921 | 210 | 46 | — | 162 | 170 | * |
| Resorcinol | 109 | 14 | 22 | 610 | 27 | 8.8 | none | | 0 |
| Hydroquinone | 109 | 14 | 37 | 650 | 27 | 8.1 | none | | 0 |

*extender melts at 180° C. which interferes with polyamide peak.

The data show that all the compositions, except those containing the low molecular weight phenol plasticizers, resorcinol and hydroquinone, exhibit good load-bearing capacity by having high modulus values (both 100% and Young's) and that they retain substantially all of the polyamide crystallinity as shown by the differential thermal analysis data which indicates the compositions are suitable for high temperature applications. The compositions containing resorcinol and hydroquinone exhibit extremely low modulus values and complete loss of polyamide crystallinity. Significantly, Stock 1 shows that elastoplastic compositions are obtained without any plasticizer and that the presence of inert plasticizers of the invention or high molecular weight (>200) phenols, (although they may aid in the processing of the composition, i.e., facilitating the calendering, extrusion, etc., of the compositions) are not necessary for obtaining elasticity or thermoplasticity and for practical purposes act as extenders. Thus, compositions consisting essentially of about 20-50 parts by weight crystalline polyamide and about 50-80 parts by weight of rubber per 100 parts total weight of polyamide and rubber are thermoplastic elastomers and may include inert plasticizers and high molecular weight phenols. Inert plasticizers can serve primarily as extenders and don't extensively react with the polyamide to destroy its crystallinity. The inert plasticizers of the invention are called "plasticizers" because such materials are classified in the art as plasticizers.

It has been found that the addition of a dimethylol phenolic compound to blends of thermoplastic crystalline polyamide and nitrile rubber substantially improves properties including tensile strength. Generally, the amount added is about 0.2-10 parts by weight dimethylol phenolic compound per 100 total parts by weight of polyamide and nitrile rubber. The function of the dimethylol phenolic compound is not completely understood but it is not a plasticizer and is effective when mixed at high temperature even in the absence of cure activators. The presence of dimethylol phenolic compound in the blend may increase the gel content of the nitrile rubber only slightly, or even not at all. Surprisingly, high strength blends are obtained even when the gel content of the nitrile rubber is less than 80 percent with suitable blends being obtained with the nitrile rubber having a gel content of 50 percent or more. Analysis of dimethylol phenolic compound modified-blend indicates the possible presence of up to four weight percent, of a graft of polyamide and nitrile rubber. A portion of the dimethylol phenolic compund is believed to react with the polyamide forming cross-links between polymer molecules causing an increase in melt viscosity. This can improve the mixing of the blend components. Of course, the degree of cross-link formation in the polyamide is of a limited extent since the thermoplasticity of the blend is maintained. Large quantities of dimethylol phenolic compound can reduce or eliminate thermoplasticity, therefore, they should be avoided. The maximum quantity varies depending upon the type of dimethylol phenolic compound, type of polyamide and nitrile rubber, the proportion of polyamide and nitrile rubber in the blend, and the presence or absence of other ingredients, such as, plasticizers and fillers. Preferably, the amount is between about 0.5-5 parts by weight per 100 total parts by weight of polyamide and nitrile rubber.

Blends of the invention containing dimethylol phenolic compound are illustrated in Table XII. The compositions comprise 65 parts by weight nitrile rubber, 35 parts by weight polyamide, 1 part by weight Flectol H and the indicated parts by weight of dimethylol phenolic compound. The typical procedure is followed with the dimethylol phenolic compound being added after the polyamide melts and is mixed with the rubber with mixing continuing until after a maximum consistency is reached. Stocks 1-5 contain a self-curing nitrile rubber and stocks 6-13 contain a non-self curing nitrile rubber. These are the same rubbers as in stock 7, Table II and Stock 5, Table III, respectively. The dimethylol phenolic compound used to illustrate the invention is 2,6-dimethylol-4-nonyl phenol. It was obtained under the trade name SP-1045. The data show that addition of dimethylol phenolic compound to blends containing either self-curing or non self-curing nitrile rubber increases the tensile strength. The tensile strength increase varies with the amount of dimethylol phenolic compound added. Better compositions are obtained when the Brabender oil temperature is above the melting point of the nylon. It is less preferred to rely largely upon heat generated by mixing to melt the nylon.

Suitable dimethylol phenolic compound may be prepared by condensation of an alkyl ($C_1$-$C_{10}$) substituted phenol, halogen substituted phenol or unsubstituted phenol with an aldehyde, preferably, formaldehyde in an alkaline medium or by condensation of phenoldialcohols. "Dimethylol phenolic compound" includes polymeric phenols containing up to 10 benzene rings but preferred compounds contain no more than three benzene rings. Halogen-free dimethylol phenolic compounds are more preferred. For details concerning satisfactory dimethylol phenolic compounds see Hartman U.S. Pat. No. 3,909,463, col. 3, lines 57-68, col. 4, lines 1-36 (lines 22-28 for examples of suitable compounds) which disclosure is incorporated herein by reference.

TABLE XII

| Sample No. | Nylon | SP-1045 | Brabender Oil temp., °C. | UTS, Kg./cm² | M100, Kg./cm² | E, Kg./cm² | Ult. Elong., % | (TS)²/E, Kg./cm² | Hardness, Shore D | Ten. Set, %, Hours | ASTM#3 Oil Swell, % at 150° C., 70 |
|---|---|---|---|---|---|---|---|---|---|---|---|
| 1 | Nylon 6-6,6,6-10 | — | 180 | 106 | 76 | 338 | 200 | 33 | 33 | 11 | 13 |
| 2 | Nylon 6-6,6,6-10 | 1.3 | 180 | 231 | 124 | 1179 | 310 | 45 | 44 | 15 | 12 |
| 3 | Nylon 6 | 1.3 | 220 | 178 | 140 | 1007 | 190 | 31 | 41 | 22 | 11 |
| 4 | Nylon 6,6-6 | — | 200 | 179 | 116 | 977 | 260 | 33 | 38 | 28 | 12 |
| 5 | Nylon 6,6-6 | 1.3 | 200 | 199 | 123 | 1218 | 300 | 33 | 42 | 36 | 12 |
| 6 | Nylon 6 | — | 200 | 70 | — | 501 | 90 | 10 | 33 | — | 15 |
| 7 | Nylon 6 | 1.3 | 200 | 155 | 138 | 924 | 130 | 26 | 40 | 30 | 13 |
| 8 | Nylon 6 | 1.3 | 220 | 172 | 137 | 819 | 160 | 36 | 37 | 25 | 13 |
| 9 | Nylon 6 | 2.6 | 200 | 200 | 192 | 1638 | 120 | 24 | 46 | 43 | 12 |
| 10 | Nylon 6 | 3.9 | 200 | 241 | 215 | 1976 | 140 | 29 | 48 | 41 | 10 |
| 11 | Nylon 6,6-6 | — | 200 | 91 | 91 | 485 | 110 | 17 | 34 | 25 | 14 |
| 12[1] | Nylon 6,6-6 | 1.3 | 200 | 149 | 145 | 1325 | 120 | 17 | 43 | 38 | 12 |
| 13[1] | Nylon 6,6-6 | 1.3 | 220 | 199 | 133 | 1003 | 270 | 39 | 42 | 34 | 13 |

[1]Blend also contains 1.3 parts by weight $TiO_2$.

A study of the effect of inert plasticizer and filler is shown in Table XIII. The compositions contain the same self-curing nitrile rubber as in Table XII, nylon 6,6-6 copolymer, N-ethyl-o,p-toluene sulfonamide (Santicizer ® 8 Plasticizer), and kaolin clay (containing one percent by weight silane coupling agent) in the indicated proportions. In addition, all compositions contain 2 parts by weight N-1,3-dimethylbutyl N'-phenyl-p-phenylenediamine (antidegradant) per 100 total parts by weight polyamide and nitrile rubber and 3 parts by weight dimethylol p-nonyl phenol and one part by weight $TiO_2$ per 100 parts by weight nitrile rubber. The compositions are prepared by charging nylon and a masterbatch containing nitrile rubber, plasticizer and clay to a Brabender mixer at an oil bath temperature of 230° C. and mixing at 100 rpm until the nylon melts. Mixing speed is reduced to 50 rpm and the dimethylol p-nonyl phenol and $TiO_2$ are added; mixing is continued until after a maximum consistency is reached. Antidegradant is added and mixed for one minute. The mass is removed, sheeted, and then remixed for two minutes. Sample specimens are prepared by compression molding at 250° C. with cooling under pressure.

The data show that a broad spectrum of properties can be obtained by varying the proportions of polyamide, nitrile rubber, plasticizer and clay. It is noteworthy that the compositions containing large quantities of plasticizer exhibit useful properties. For example, stock 4 containing about 54 weight percent plasticizer is suitable for low performance applications. Differential thermal analysis indicates a nylon melt peak of 165° C. The area under the melt peak indicates that most of the crystallinity is retained even when relatively large amounts of inert plasticizer are present.

TABLE XIII

| Sample No. | Nitrile Rubber | Nylon | Santicizer 8 | Clay | UTS, Kg./cm² | M100, Kg./cm² | E, Kg./cm² | Ult. Elong.,% | Hardness Shore D | Tension Set, % |
|---|---|---|---|---|---|---|---|---|---|---|
| 1 | 76 | 24 | 19 | 19 | 154 | 107 | 243 | 180 | 35 | 12 |
| 2 | 70 | 30 | 52.5 | 17.5 | 128 | 54 | 132 | 340 | 26 | 11 |
| 3 | 65 | 35 | — | — | 285 | 170 | 1977 | 320 | 50 | 55 |
| 4[1] | 65 | 35 | 121 | — | 46 | 20 | 31 | 280 | 16 | 11 |
| 5 | 55 | 45 | 27.5 | — | 169 | 111 | 999 | 310 | 46 | 30 |
| 6 | 55 | 45 | 27.5 | 27.5 | 222 | 153 | 1005 | 260 | 47 | 24 |
| 7 | 55 | 45 | 27.5 | 55 | 220 | 183 | 878 | 170 | 48 | 22 |
| 8 | 48 | 52 | 48 | 24 | 165 | 113 | 670 | 260 | 43 | 25 |
| 9 | 44 | 56 | 11 | 11 | 276 | 225 | 3845 | 250 | 61 | 58 |
| 10 | 36 | 64 | 27 | 9 | 220 | 186 | 1901 | 230 | 55 | 40 |
| 11[2] | 36 | 64 | 27 | 27 | 274 | 240 | 2769 | 200 | 60 | 42 |

[1]Blend contains 2 parts dimethylol p-nonyl phenol per 100 parts of nitrile rubber.
[2]Blend contains 9 parts dimethylol p-nonyl phenol per 100 parts of nitrile rubber.

Although the invention has been illustrated by typical examples, it is not limited thereto. Changes and modifications of the examples of the invention herein chosen for purposes of disclosure can be made which do not constitute departure from the spirit and scope of the invention.

The embodiments of the invention in which an exclusive property or privilege is claimed are defined as follows:

1. An electroplastic composition comprising a blend of thermoplastic crystalline polyamide in an amount sufficient to impart thermoplasticity up to 50 weight percent of the composition and nitrile rubber, comprising a polymer of 1,3 butadiene or isoprene and vinyl nitrile monomer, in an amount sufficient to impart rubberlike elasticity up to 80 weight percent of the composition, modified by reaction with 0.2–10 parts by weight of dimethylol phenolic compound per 100 total parts by weight of polyamide and rubber.

2. The composition of claim 1 in which the dimethylol phenolic compound is dimethylol $C_1$–$C_{10}$ alkyl phenol.

3. In a thermoplastic composition comprising a blend of thermoplastic crystalline polyamide and nitrile rubber, comprising a polymer of 1,3 butadiene or isoprene and vinyl nitrile monomer, the improvement comprises reacting the blend and 0.2–10 parts by weight dimethylol phenolic compound per 100 total parts by weight polyamide and rubber.

4. The composition of claim 3 in which 0.5–5 parts by weight of dimethylol $C_1$–$C_{10}$ alkyl phenol is reacted.

5. A process of preparing elastoplastic compositions which comprises blending about 20–50 parts by weight of crystalline thermoplastic polyamide, about 50–80 parts by weight of nitrile rubber, comprising a polymer of of 1,3 butadiene or isoprene and vinyl nitrile monomer, and about 0.2–10 parts by weight dimethylol phenolic compound per 100 total parts by weight of polyamide and rubber at a temperature sufficient to melt said polyamide, masticating the blend continuously at 150°–270° C. until reaction of said phenolic compound is essentially complete.

6. The process of claim 5 which comprises blending 0.5–5 parts by weight of dimethylol $C_1$–$C_{10}$ alkyl phenol.

7. The process of claim 5 in which the polyamide melts between 160°–230° C.

* * * * *